United States Patent Office 2,867,664
Patented Jan. 6, 1959

2,867,664

PROCESS FOR THE PRODUCTION OF TRIPHENYL-DODECYLPHOSPHONIUM-PENTACHLORPHEN-OLATE AND ITS STABLE AQUEOUS SOLUTIONS

August Kottler and Heinrich Scheffler, Biberach an der Riss, Germany, assignors to Dr. Karl Thomae G. m. b. H., Chemisch-Pharmazeutische Fabrik, Biberach an der Riss, Germany, a firm No Drawing. Application July 21, 1953
Serial No. 369,533

Claims priority, application Germany July 25, 1952

10 Claims. (Cl. 260—606.5)

The present invention relates to a process for the production of triphenyl-dodecylphosphonium-pentachlorphenolate and stable aqueous solutions of this compound.

The alkali metal salts, the alkaline earth salts and the salts of organic bases of pentachlorphenol, as well as the salts of triphenyl-dodecylphosphonium are known and distinguished by high anti-mycotic action.

As has now been found, the anti-mycotic action of pentachlorphenolate of triphenyl-dodecylphosphonium is considerably greater than that of the individual components. For the production of triphenyl-dodecylphosphonium-pentachlorphenolate, which heretofore has not been described in the literature, molar quantites of alkali metal pentachlorphenolate are reacted with triphenyl-dodecylphosphonium-halogenide preferably in aqueous or aqueous-alcohol solution and the precipitate that is formed is separated. Preferably ethyl alcohol solutions are used. However, also pentachlorphenoldodecyl ether can be reacted with triphenylphosphine at increased temperatures in the range of 20–100° C. and, if desired, in the presence of a suitable organic solvent, such as ethylene glycol. The new compound possesses a surprisingly great range of action.

For the production of stable aqueous solutions of triphenyldodecylphosphonium-pentachlorphenolate, which is soluble with difficulty in water, use is preferably made of a dissolving agent. There have been proven to be particularly adapted to this purpose mineral acid salts or salts of organic acids such as acetic acid or lactic acid, of tertiary alkylamines and alkanolamines with at least one long-chain aliphatic residue containing 8–14 carbon atoms, such for example as diethyldodecylamine and diethanoldodecylamine. Use is made advantageously of 1–5 parts of the aforementioned salts to 1 part of triphenyl-dodecylphosphonium-pentachlorphenolate.

Stable, aqueous solutions of triphenyl-dodecylphosphonium-pentachlorphenolate can also be obtained by reacting the pentachlorphenol salts of long-chain tertiary amines and alkanol-amines with triphenyl-dodecylphosphonium salts, for example the halogenides. As long-chain tertiary amines use is made of the bases underlying the abovementioned solvents. The advantage is then obtained that the required dissolving agent for the production of stable aqueous solutions is formed at the time of the reaction. This form of execution of the process is of particular significance for the reason that it is not possible to obtain stable aqueous solutions by simple reaction of alkali metal pentachlorphenolate with triphenyl-dodecylphosphonium halogenide.

The invention will be described in greater detail in the following specific examples.

Example 1.—*Triphenyl-dodecylphosphonium-pentachlorphenolate*

In a round-bottom flask of 250 ccm., provided with a stirrer, 50 ccm. precisely of a normal NaOH (0.05 mol) is treated with 14 g. of pure pentachlorphenol (0.0525 mol) and the mixture is stirred at room temperature until the pH reaches a value of 7.2 to 7.8. The excess pentachlorphenol is suction-filtered and is further washed with 50 ccm. of water. The clear filtrate is introduced with stirring at room temperature into a solution of 26 g. of pure triphenyldodecyl-phosphonium bromide (0.05 mol) in 100 ccm. of methanol. An oily precipitate forms immediately. The mixture is stirred for a further period of 10 minutes and is then shaken with ether. The layers are separated and the ethereal solution is washed repeatedly with distilled water, is dried with sodium sulphate and is evaporated. There remains a viscous brownish oil. Yield: 34.5 g.=99% of theory. Cl.: 25.3%. Cl found: 26.0%.

The new compound is substantially insoluble in water, is soluble with difficulty in petroleum ether and on the other hand is readily soluble in chloroform, acetic ester and n-butanol.

Example 2

20 g. of N,N-diethyldodecylaminehydrochloride and 70 g. of water are added to 10 g. of the substance obtained according to Example 1. After thorough stirring there is obtained without heating in a short time a clear solution that can be diluted with water in any ratio.

Example 3

26.6 g. of pentachlorphenol is fused together with 24.1 g. of diethyldodecylamine on a boiling water bath and is then treated with a solution of 50 g. of diethyl-dodecyl-aminehydrochloride in 250 ccm. of water. After stirring a very viscous, strongly turbid solution is obtained (Solution I). 51.1 gr. of triphenyl-dodecylphosphonium-bromide is dissolved with 50 g. of diethyl-dodecylamine-hydrochloride in 250 ccm. of water (Solution II).

After combination of Solution I and Solution II, about a 10% solution of triphenyl-dodecylphosphonium-pentachlorphenolate is obtained with about a 1.8-fold quantity of the dissolving agent.

The solution is completely clear and stable to heating up to 100° C. and cooling down to 0° C. It can be diluted with water in any proportion.

Example 4

The process of example 1 was followed with the exception that 50 ccm. of a normal KOH (0.05 mol) was used instead of 50 ccm. of a normal NaOH and 24 g. (0.05 mol) of triphenyldodecylphosphonium chloride instead of 26 g. triphenyldodecylphosphonium bromide. The result was the same as obtained when following the process of Example 1.

Example 5

5.2 g. (0.012 mol) pentachlorphenol-dodecyl-ether are mixed with 3.12 g. (0.012 mol) triphenyl-phosphine, and the mixture is heated to 140–160° C. for 72 hours. After cooling the reaction mixture is extracted for several times with petroleum ether, boiling in the range of 40–60° C. The triphenyldodecylphosphonium-pentachlorphenolate remains in the form of a dark viscous oil. Yield: 65% of theory.

What we claim is:

1. Process for the production of triphenyl-dodecyl-phosphonium-pentachlorphenolate which comprises mixing a substance taken from the class consisting of alkali metal pentachlorophenolates, higher alkyl amine pentachlorophenolates and higher alkanol amine pentachlorophenolates with a compound taken from the class consisting of triphenyl-dodecyl-phosphonium chloride and bromide.

2. Process according to claim 1 in which the reaction is carried on in the presence of solvents taken from the class consisting of alcohol and water when alkali metal pentachlorophenolate is a reactant, diethyldodecylamine hydrochloride when higher alkyl amine pentachlorophenolate is a reactant.

3. Process according to claim 2 in which said alcohol contains methanol.

4. Process according to claim 2 in which said higher alkyl amine phenolate is a salt of a tertiary alkylamine having at least one alkyl group having 8 to 14 carbon atoms in the presence of diethyldodecylamine hydrochloride.

5. Process according to claim 1 in which said product is rendered water soluble by the addition of a dissolving agent which is N,N-diethyldodecylamine hydrochloride.

6. Process according to claim 1 in which said product is rendered water soluble by the addition of a substance taken from the class consisting of mineral and organic acid salts of tertiary alkylamines and alkanolamines having at least one aliphatic radical of 8 to 14 carbon atoms.

7. Process according to claim 6 in which said acid is acetic.

8. Process according to claim 6 in which said acid is lactic.

9. Triphenyl - dodecylphosphonium - pentachlorphenolate.

10. Stable aqueous solution of triphenyl-dodecylphosphonium-pentachlorphenolate.

References Cited in the file of this patent

UNITED STATES PATENTS

| | | |
|---|---|---|
| 1,921,364 | Lommel et al. | Aug. 8, 1933 |
| 2,327,338 | Carswell | Aug. 24, 1943 |
| 2,353,964 | Lommel et al. | July 18, 1944 |
| 2,541,816 | Glarum | Feb. 13, 1951 |